US008582442B2

(12) United States Patent
Walley et al.

(10) Patent No.: US 8,582,442 B2
(45) Date of Patent: Nov. 12, 2013

(54) SYSTEMS AND METHODS FOR REDUCING AUDIO LATENCY

(75) Inventors: John Walley, Ladera Ranch, CA (US); Sumit Sanyal, Santa Cruz, CA (US)

(73) Assignee: Broadcom Corporation, Irvine, CA (US)

(*) Notice: Subject to any disclaimer, the term of this patent is extended or adjusted under 35 U.S.C. 154(b) by 287 days.

(21) Appl. No.: 13/025,360

(22) Filed: Feb. 11, 2011

(65) Prior Publication Data

US 2011/0199909 A1 Aug. 18, 2011

Related U.S. Application Data

(60) Provisional application No. 61/337,930, filed on Feb. 12, 2010.

(51) Int. Cl.
*H04L 12/26* (2006.01)

(52) U.S. Cl.
USPC .......... 370/241

(58) Field of Classification Search
USPC .......... 370/241, 328, 352, 516
See application file for complete search history.

(56) References Cited

U.S. PATENT DOCUMENTS

| | | | | |
|---|---|---|---|---|
| 6,658,027 | B1 * | 12/2003 | Kramer et al. | 370/516 |
| 2008/0259846 | A1 * | 10/2008 | Gonikberg et al. | 370/328 |
| 2009/0298431 | A1 * | 12/2009 | Rasmussen | 455/41.3 |
| 2010/0091769 | A1 * | 4/2010 | Magliaro et al. | 370/352 |

* cited by examiner

*Primary Examiner* — Albert T Chou
(74) *Attorney, Agent, or Firm* — Farjami & Farjami LLP

(57) ABSTRACT

Provided are systems and methods for providing reduced audio latency in wireless communications. One electronic system providing reduced audio latency includes a host unit for converting audio data, a digital interface coupling the host unit and a wireless transceiver, where the wireless transceiver has a controller including a rate adapter, and where the controller is configured to monitor a rate mismatch between the host unit and the wireless transceiver and to compensate for the rate mismatch using the rate adapter, thereby reducing the audio latency. One controller includes an audio codec for encoding and decoding the audio data, where the controller is further configured to align a frame of encoded audio data and a transmission packet of the wireless transceiver, thereby further reducing the audio latency.

20 Claims, 3 Drawing Sheets

SYSTEMS AND METHODS FOR REDUCING AUDIO LATENCY

RELATED APPLICATIONS

This application is based on and claims priority from U.S. Provisional Patent Application Ser. No. 61/337,930 filed on Feb. 12, 2010, which is hereby incorporated by reference in its entirety.

BACKGROUND OF THE INVENTION

1. Field of the Invention

The present invention relates generally to wireless communication. More particularly, the present invention relates to reducing audio latency in wireless communications.

2. Background Art

Wireless communications permeate modern social interaction throughout most of the world. Characteristically, wireless communications are much quicker and less expensive to implement, and so they often form the basis for any contemporary contract for communication infrastructure. For example, critical emergency infrastructure typically relies on wireless communications to quickly and effectively respond to crises that may hamper communications using more terrestrial means, such as wired communications, or actual immediate presence. Moreover, wireless communications increasingly play an important part in world politics, where, for example, the realistic reproduction of a single voice communicated wirelessly to the population of a country can motivate millions.

As such, systems for wireless communications involving audio, and especially speech, typically become more desirable as they become more able to reproduce realistic sounds and circumstances. For example, with respect to reproducing realistic sounds, the realistic reproduction of a human voice can facilitate an emergency response based on stress detected in a voice, or under other circumstances, can simply facilitate better communication by incorporating more nuance and audio fidelity. With respect to realistic circumstances, interactivity between two speakers, for example, is much enhanced when a discussion can be had without constant perceptible pauses due to latencies injected by the type of wireless communication system used.

Unfortunately, using conventional methods, increasing one type of realism typically reduces the other. For example, the use of wideband audio for wireless communications, such as wideband speech, which attempts to increase the fidelity of audio communicated between devices, may increase audio latency by increasing bandwidth requirements or, alternatively, by requiring an audio encoding and decoding process that can introduce its own additional latency due to interface effects, particularly in conventional modularized communication systems.

Accordingly, there is a need to overcome the drawbacks and deficiencies in the art by providing systems and methods for wireless communications that substantially reduce or eliminate associated audio latency.

SUMMARY OF THE INVENTION

The present application is directed to systems and methods for reducing audio latency, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
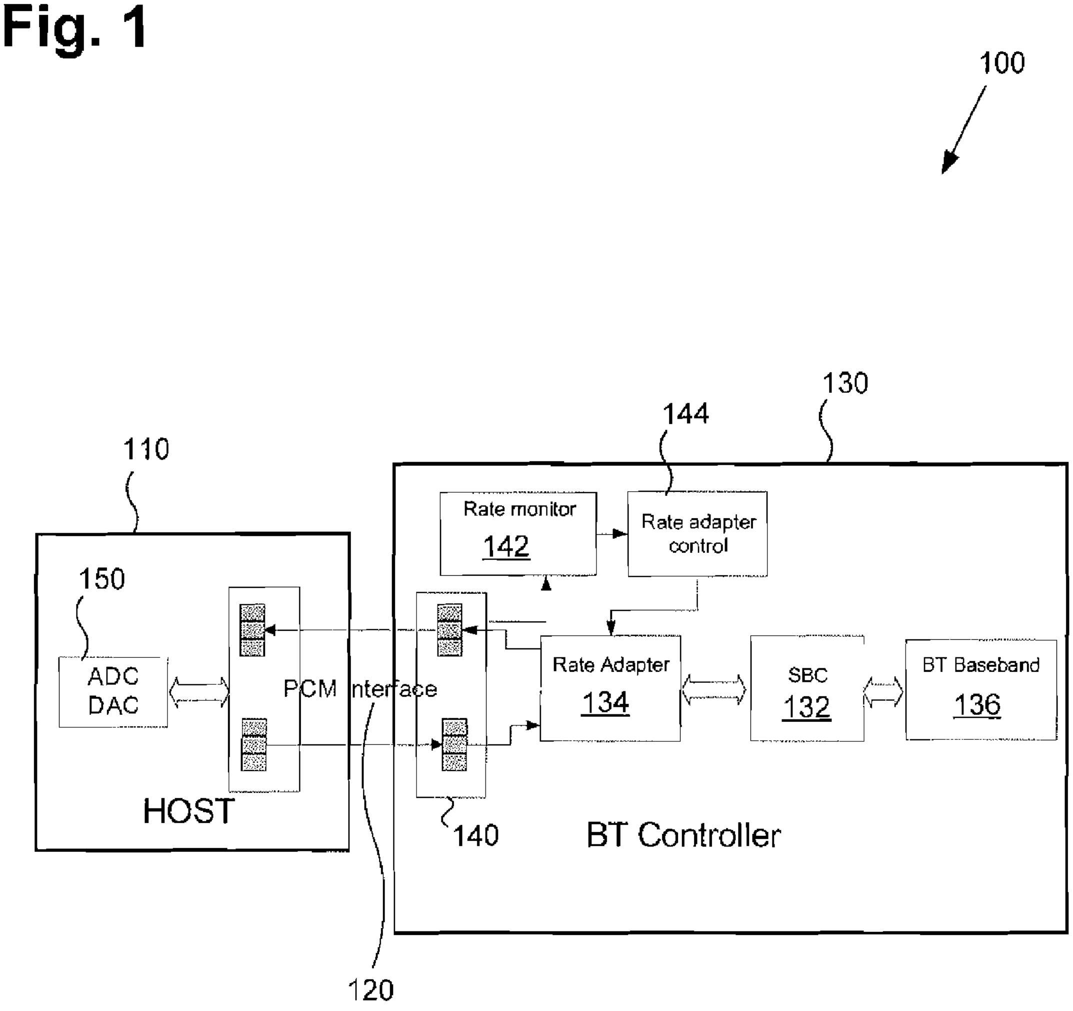
FIG. 1 presents a diagram of a system and method for providing reduced audio latency, according to one embodiment of the present invention.

The present application is directed to systems and methods for reducing audio latency. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, conventional approaches to providing wideband wireless audio communications can result in undesirably high levels of audio latency. This audio latency problem can be examined in the context of at least two distinct sets of problems, one set of problems relating to rate mismatch, and a second set of problems relating to frame alignment. The present application discloses systems and methods directed to solutions addressing both types of problems.

As a preliminary matter, it is noted that embodiments of the present inventive concepts are described in terms of wideband audio data transmission between Bluetooth devices. However, that characterization is provided merely as an aid to conceptual clarity and is by no means intended as a limitation. As would be apparent to one of ordinary skill in the art, the present inventive concepts may be suitably adapted and applied to any type of audio data communicated over a broad range of wireless transmission protocols, of which Bluetooth transmissions form an example subset.

During typical Bluetooth audio transmissions, for example, rate mismatch problems may arise due to a difference in base clock frequencies between a controller for a Bluetooth transceiver (e.g., a Bluetooth controller) and a host unit, for example. More generally, rate mismatch can occur whenever audio data is transported across multiple clock domains that can drift and/or jitter relative to one another. Rate mismatch may lead to a variety of audio communication problems, for example, and conventional methods addressing such problems typically result in a significantly increased audio latency and/or decreased audio quality.

Because rate mismatch may arise from any clock domain transition, the complexity and effectiveness of the presently proposed rate mismatch solutions may vary based on the physical transport and/or protocol used for a host/controller interface (HCI), for example. For instance, an HCI may include one or more of a universal serial bus (USB) transport, a universal asynchronous receiver/transmitter (UART) transport, and a pulse code modulation (PCM) protocol enabled over a physical transport such as SlimBus or Peripheral Component Interconnect Express (PCI-E), for example, where each type of interface introduces variations to implementation of the inventive principles disclosed herein.

In a Bluetooth environment, rate matching can be performed on a host unit or on a Bluetooth controller for a Bluetooth transceiver, for example, and both approaches are addressed by the present disclosure. By way of overview, it is worth noting that in most cases, rate matching problems can be resolved, using the present inventive concepts, without substantially impacting audio quality, such as wideband speech quality, for example. However, even in those instances in which rate matching according to the present concepts may result in an overall degraded audio quality, the quality of wideband speech communication can be maximized by restricting add/drops of portions of audio data, for example, to "no speech" regions, and/or utilizing packet loss concealment (PLC) techniques, for example. Additionally, it should be understood that although the present disclosed solutions are described primarily in terms of frame based audio codecs, similar techniques may be applied to sample based audio codecs when resolving rate mismatch.

With respect to frame based codecs, frame alignment problems can arise when frames of encoded audio data are sent over an HCI without a Bluetooth controller having information about the frame boundaries, for example. As with rate mismatch, it is noted that solutions for reducing audio latency arising from such frame alignment problems may vary with a type of interface. For HCI over USB, for example, an HCI synchronous packet length is typically determined by a USB descriptor and must be the same for every active connection on the HCI. As a result, a Bluetooth controller may be unable to reliably align frames of encoded audio data transferred over such an HCI with transmission packets for an established enhanced synchronous communication oriented (eSCO) link, for example, by relying solely on compensating for a mismatch rate. In such case, the Bluetooth controller can be configured to allow the frames of encoded audio data to "float" on the eSCO link, for example, where the frames are not aligned with the transmission packets, or the Bluetooth controller can be configured to reduce audio latency by searching for a frame header, indentifying the frame, and aligning the frame with an eSCO transmission packet, for example. For instance, where the audio codec comprises a subband codec (SBC) configured to have approximately a 7.5 ms frame rate, the Bluetooth controller may reduce audio latency by approximately 7.5 ms by searching for an SBC frame header.

Alternatively, for HCI over UART, a host unit may set a payload length of an HCI synchronous data packet to be a multiple of an SBC frame, e.g., 1×59 bytes, 2×59 bytes, and the like. Under such circumstances, the Bluetooth controller can be configured to readily identify the SBC frames and align them with a transmission packet for an eSCO link, for example. In still another alternative, encoded audio may be sent over an HCI using PCM as a byte stream, rather than as an audio data stream, for example, and frames of the encoded audio can be allowed to float or have their headers searched for frame alignment to occur. It is noted that frame alignment by the Bluetooth controller may proceed when rate matching is performed on the host unit such that the incoming byte stream is synchronized with a clock of the Bluetooth controller.

The inventive solutions for reducing audio latency disclosed in the present application may be grouped according to three broad embodiments:

1. Implementation of a codec on a controller for a wireless transceiver (e.g., on a Bluetooth controller for a Bluetooth transceiver, for example), with rate matching and frame alignment being performed by the controller;

2. Implementation of a codec on a host unit, with rate matching being performed by the host unit and frame alignment being performed by a controller;

3. Implementation of a codec on a host unit, with rate matching being performed by a controller.

FIG. 1 shows wireless communication environment 100 configured to reduce audio latency, according to one embodiment of the present inventive concepts. According to the embodiment shown in FIG. 1, wireless communication environment 100 includes host unit 110 and Bluetooth controller 130 linked by PCM interface 120. Host unit 110 may be any electronic device or group of electronic devices capable of converting analog audio into audio data and/or audio data into analog audio, for example, and exchanging audio data over an HCI, such as PCM interface 120. For example, host unit 110 may comprise a personal computer, a cellular phone, a sound card or adapter, an integrated sound module or chip, or the like.

It is noted that although wireless communication environment 100 presents the specific example of audio data exchanged using PCM, the techniques described in conjunction with FIG. 1 are also applicable to audio data exchanged over any type of HCI. In addition, as noted above, although wireless communication environment 100 presents the specific example of audio data communicated using a Bluetooth transceiver, of which Bluetooth controller 130 may be a component, for example, the techniques described in conjunction with FIG. 1 are also applicable to audio data communicated using any type of wireless communication system.

According to the embodiment of FIG. 1, audio encoding, rate matching and frame alignment may all be implemented on Bluetooth controller 130. For example, host unit 110 may be configured to use ADC/DAC 150 to convert audio and to exchange linear or un-encoded audio data with Bluetooth controller 130 over, for example, PCM interface 120. Bluetooth controller 130 may be any electronic device or group of electronic devices configured to control a wireless transceiver, such as a Bluetooth transceiver (not explicitly shown in FIG. 1), for example, and mediate operation of an HCI, for example. In the embodiment illustrated by FIG. 1, Bluetooth controller 130 can be configured to use rate monitor 142 to monitor utilization of PCM buffers 140 and to maintain long term averages of that utilization, for example. From that information, Bluetooth controller 130 can be configured to use rate adapter control 144, for example, to monitor and/or estimate a rate mismatch between a clock of host unit 110 and a clock of Bluetooth controller 130. Bluetooth controller 130 can be further configured to use rate adapter 134 to compensate for the monitored rate mismatch by, for example, performing either sample rate conversion or sample add/drop on the linear or un-encoded audio data exchanged with host unit 110, for example.

As a result, when transmitting audio, Bluetooth controller 134 may be configured to then use SBC 132 to encode the rate matched linear audio data provided by rate adapter 134 and provide a frame of encoded audio data to baseband 136 substantially concurrently with baseband 136 crafting and transmitting an outgoing transmission packet, for example, for communication with another Bluetooth device. In such embodiment, SBC 132 and baseband 136 may be configured such that a full frame of encoded audio data may be encapsulated by an integer number of synchronous transmission packets, such as a single 2EV3 packet for an eSCO link, for example. Reception of audio may be performed substantially concurrently by receiving an integer number of incoming transmission packets corresponding to a full frame of encoded audio data and providing each extracted frame of encoded audio data to SBC 132, where SBC 132 and rate adapter 134 are configured to provide rate matched linear or un-encoded data to host unit 110 over PCM interface 120, in a process similar to that described above. Thus, embodiments of the present inventive concepts can compensate for rate mismatch while aligning frames of encoded data and transmission packets, thereby reducing or eliminating audio latency due to rate mismatch and frame/packet misalignment.

Implementing SBC 132, rate adapter 134, and frame alignment 136 on Bluetooth controller 130, rather than distributing that collective functionality between Bluetooth controller 130 and host unit 110 may be particularly advantageous, for example, because such arrangement enables decoupling of host unit 110 from any wireless transmission/reception (e.g., Bluetooth) related timing issues. In addition, according to the embodiment of FIG. 1, Bluetooth controller 130 is in possession of all necessary information to compensate for rate mismatch and perform frame alignment locally.

It is noted that implementation of the solution represented in FIG. 1 may benefit when utilization of PCM buffers 140 is automatically adjusted according to the frequency with which rate mismatch data is guaranteed to reach rate monitor 142, for example. That is to say, in situations in which the HCI is occupied with high priority traffic, utilization of PCM buffers 140 may need to be increased or decreased in order to assure that rate changes are able to take effect before buffer underflow or overflow occurs. In other embodiments, where the size of PCM buffers 140 may be increased through additional allocation of general memory resources, for example, of Bluetooth controller 130, Bluetooth controller 130 may be configured to automatically increase a size of PCM buffers 140 in order to ensure that rate mismatch compensation is able to take effect before buffer underflow or overflow occurs. The embodied solution represented in FIG. 1 may be implemented so as to reduce audio latency to as little as approximately 10 ms, for example.

Figure 2A:
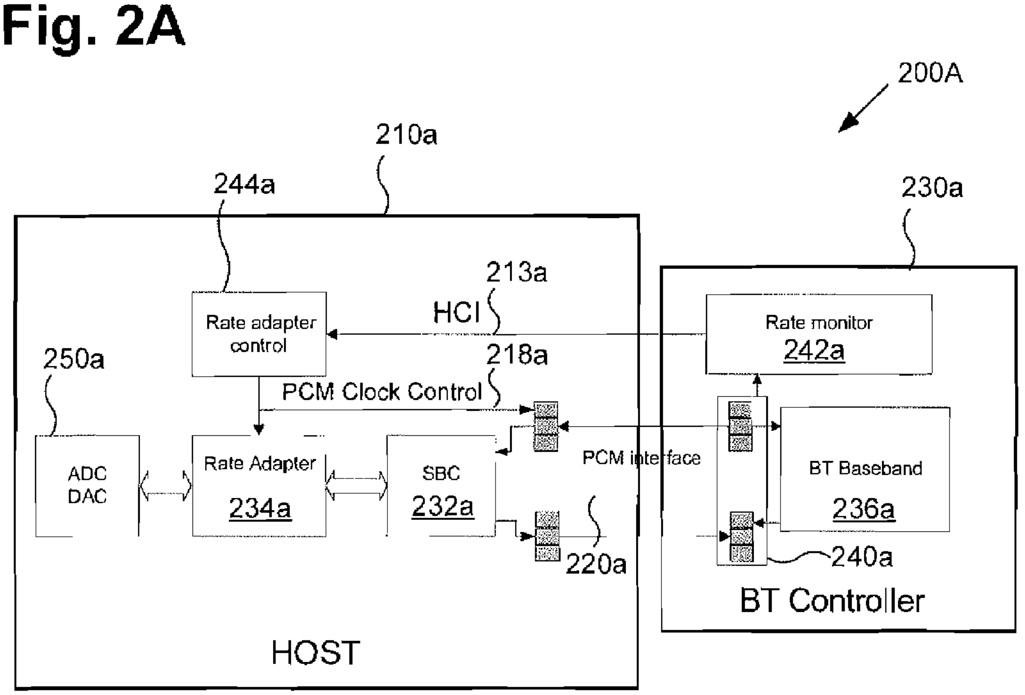
FIG. 2*a* presents a diagram of a system and method for providing reduced audio latency, according to one embodiment of the present invention.
Figure 2B:
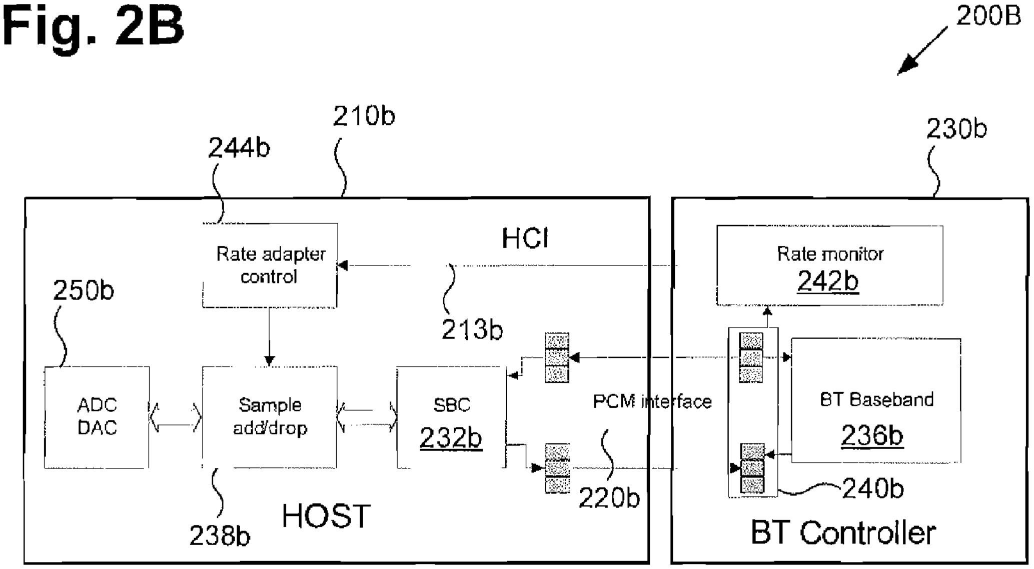
FIG. 2*b* presents a diagram of a system and method for providing reduced audio latency, according to one embodiment of the present invention.

FIGS. 2A and 2B show respective wireless communication environments 200A and 200B configured to reduce audio latency, according to alternative embodiments of the present inventive concepts. As shown in FIGS. 2A and 2B, wireless communication environments 200A and 200B include respective host units 210*a* and 210*b*, and respective Bluetooth controllers 230*a* and 230*b*. According to the embodiment of FIGS. 2A and 2B, the SBC and rate matching may be performed by respective host units 210*a* and 210*b*, while frame alignment may be performed by respective Bluetooth controllers 230*a* and 230*b*.

PCM interfaces 220*a* and 220*b*, SBCs 232*a* and 232*b*, basebands 236*a* and 236*b*, PCM buffers 240*a* and 240*b*, rate monitors 242*a* and 242*b*, rate adapter controls 244*a* and 244*b*, and ADC/DACs 250*a* and 250*b* of FIGS. 2A and 2B correspond respectively to PCM interface 120, SBC 132, baseband 136, PCM buffers 140, rate monitor 142, rate adapter control 144, and ADC/DAC 150 of FIG. 1; e.g., each corresponding structure may be configured to exhibit the same features and/or operate substantially the same as its counterpart. Furthermore, in similar fashion, rate adapter 234*a* in FIG. 2A and sample add/drop 238*b* in FIG. 2B correspond to rate adapter 134 in FIG. 1, though sample add/drop 238*b* may be relatively restricted in its operation, as is explained more fully below. As above, it is noted that although wireless communication environments 200*a* and 200*b* represent the specific example of audio data exchanged using PCM, the techniques described in conjunction with FIG. 2A and FIG. 2B are also applicable to audio data exchanged over any type of HCI.

Referring first to the embodiment illustrated by FIG. 2A, FIG. 2A shows host unit 210*a* and Bluetooth controller 230*a* linked by PCM interface 220*a* and HCI 213*a*. HCI 213*a* may comprise any digital interface capable of transferring data between Bluetooth controller 230*a* and host unit 210*a*, for example, and may even utilize the same physical transport supporting PCM interface 220*a*, for example. HCI 231*a* may also comprise a data channel encapsulated by PCM interface 220*a*, such that the data transferred using HCI 231*a is appended to a portion of a byte stream on PCM interface 220***a*. In one embodiment, Bluetooth controller 230*a* may be configured to use rate monitor 242*a* to monitor utilization of PCM buffer 240*a*, for example, and to maintain long term averages of that utilization. From such monitoring, rate monitor 242*a* can be configured to estimate a rate mismatch between a clock of host unit 210*a* and a clock of Bluetooth controller 230*a*. Bluetooth controller 230*a* can be further configured to use rate monitor 242*a* to send such rate mismatch information in periodic updates to rate adapter control 244*a* of host unit 210*a*, for example, over HCI 213*a*.

In other embodiments, Bluetooth controller 230*a* may alternatively be configured use rate monitor 242*a* only to monitor utilization of PCM buffers 240*a*, for example, and to send only the utilization to rate adapter control 244*a*, for example, which may itself estimate a rate mismatch from, for example, a long term average of that utilization. In still further embodiments, rate monitor 242*a* may be configured to monitor time of arrival of headers of, for example, frames of encoded data, in addition or alternatively to monitoring utilization of PCM buffers 240*a*. In more general terms, Bluetooth controller 230*a* may be configured to monitor any characteristic of data exchanged with host unit 210*a* that is indicative of a rate mismatch, for example, and periodically send such monitoring data or a representation of such monitoring data to host unit 210*a* to facilitate compensating for any rate mismatch.

Regardless of how or which rate mismatch information is provided to host unit 210*a*, host unit 210*a* can be configured to use rate adapter control 244*a* and rate adapter 234*a*, for example, to perform sample rate conversion on linear or un-encoded audio data, for example, both prior to encoding by SBC 232*a* and after decoding by SBC 232*a*, for example, and at least partially compensate for any rate mismatch, as monitored by Bluetooth controller 230*a*.

In addition, however, or alternatively, where host unit 210*a* is the master controller for PCM interface 220*a*, host unit 210*a* may also be configured to use rate adapter 244*a*, for example, to adjust a PCM master clock of PCM interface 210*a*, using PCM clock control 218*a*, for example, to also compensate for rate mismatch.

This combination of compensation methods, where host unit 210*a* may be configured to control a clock for an HCI used to exchange audio data, enables the present system to both compensate for the rate mismatch, as explained above, and to align frames of encoded audio data exchanged over the HCI (e.g., PCM interface 220*a*) and transmission packets transmitted and received by, for example, baseband 236*a* of Bluetooth controller 230*a*, and to do so without necessitating adding or dropping samples of linear audio data, for example, which could otherwise result in degraded wideband audio quality.

For example, Bluetooth controller 230*a* may be configured to use rate monitor 242*a* to monitor rate mismatch, as described above, and also to monitor frame misalignment by, for example, monitoring time of arrival of headers of frames of encoded data, as described above, and comparing that to time of arrival and dispatch of transmission packets by baseband 236*a*, for example. Such frame misalignment data may be communicated to rate adapter control 244*a* of host unit 210*a*, for example, which may then use such information to perform sample rate conversion and/or adjustment of a PCM clock of PCM interface 210*a*, for example, that is configured to align frames of encoded data with transmission packets transmitted or received using baseband 236*a*.

This method for frame alignment may be performed substantially concurrently with compensating for rate mismatch, as described above. As a result, the arrangement shown in wireless communication environment 200*a* can be implemented to reduce audio latency to as little as 10 ms, for example, without loss of audio frames, and advantageously without employing a sample add/drop procedure, even though neither the audio codec nor the rate matching are performed by a controller for a wireless transceiver.

Referring next to the embodiment illustrated by FIG. 2B, FIG. 2B shows host unit 210*b* and Bluetooth controller 230*b* linked by PCM interface 220*b* and HCI 213*b*. HCI 213*b*, similar to HCI 213*a* in FIG. 2A, may comprise any digital interface capable of transferring data between Bluetooth controller 230*b* and host unit 210*b*, for example, and may utilize the same physical transport supporting PCM interface 220*b*, for example. For instance, HCI 213*b* may also comprise a data channel encapsulated by PCM interface 220*b*. As was the case for wireless communication environment 200*a* in FIG. 2A, Bluetooth controller 230*b*, in FIG. 2B, can be configured to use rate monitor 242*b* to monitor utilization of PCM buffer 240*b*, for example, and to maintain long term averages of that utilization. From such monitoring, rate monitor 242*b* can be configured to estimate a rate mismatch between a clock of host unit 210*b* and a clock of Bluetooth controller 230*b*. Bluetooth controller 230*b* can be further configured to use rate monitor 242*b* to send such rate mismatch information in periodic updates to rate adapter control 244*b* of host unit 210*b*, for example, over HCI 213*b*.

In other embodiments, and in more general terms, Bluetooth controller 230*b* may be configured to monitor any characteristic of data exchanged with host unit 210*b* that is indicative of a rate mismatch, for example, and periodically send such monitoring data or a representation of such monitoring data to host unit 210*b* to facilitate compensating for any rate mismatch.

According to the embodiment of FIG. 2B, regardless of how or which rate mismatch information is provided to host unit 210*b*, host unit 210*b* can be configured to use rate adapter control 244*b* and sample add/drop 238*b* to perform sample add/drop on the linear or un-encoded audio data, for example, both prior to encoding by SBC 232*b* and after decoding by SBC 232*b*, for example, and compensate for any rate mismatch, as monitored by Bluetooth controller 230*a* and fed back to host unit 210*b* over HCI 213*b*. Thus, even where a host unit does not control an HCI clock, such as a PCM master clock for PCM interface 220*b*, for example, embodiments of the present inventive concepts may still compensate for a rate mismatch.

In addition, because Bluetooth controller 230*b* may be configured to use rate monitor 242*b* to additionally monitor frame misalignment, as described above with respect to Bluetooth controller 230*a* of FIG. 2A, the present embodiment may be similarly be configured to align frames of encoded audio data with transmission packets transmitted or received using baseband 236*b*, even where Bluetooth controller 230*b* does not control the PCM master clock for PCM interface 220*b*.

This method for frame alignment may be performed substantially concurrently with compensating for rate mismatch using, for example, sample add/drop performed on linear audio data, as described above. As a result, the arrangement shown in wireless communication environment 200*b* can be implemented to reduce audio latency to as little as 10 ms, for example, without loss of audio frames, even where a clock of an HCI cannot be adjusted (e.g., where Bluetooth controller 210*b* is not the PCM master of PCM interface 220*b*), and even though neither the audio codec nor the rate matching are performed by a controller for a wireless transceiver.

It is noted that implementation of the solutions represented in FIGS. 2A and 2B may benefit when utilization of PCM buffers 240*a* or 240*b*, for example, are automatically adjusted according to the frequency with which rate mismatch information is guaranteed to reach respective host unit 210*a* or 210*b*. That is to say, in situations where HCI 213*a* or 213*b* is occupied with other high priority traffic, respective host unit 210*a* or 210*b* may be configured to increase or decrease utilization of corresponding PCM buffers 240*a* or 240*b* in order to ensure that rate mismatch compensation is able to take effect before buffer underflow or overflow occurs. For example, host units 210*a* and 210*b* may be configured to increase or decrease buffer utilization depending on whether past utilization data indicates an increasing or decreasing trend, for example.

In other embodiments, where the size of PCM buffers 240*a*, for example, may be increased through additional allocation of general memory resources, for example, of Bluetooth controller 230*a*, host unit 210*a* may be configured to automatically increase a size of PCM buffer 240*a* in order to ensure that rate mismatch compensation is able to take effect before buffer underflow or overflow occurs. Alternatively, Bluetooth controller 230*a* may be configured to use rate monitor 242*a*, for example, to manage utilization and/or size of PCM buffers 240*a* according to high priority traffic affecting exchange of encoded audio data over PCM interface 220*a*. Obviously, the embodiments illustrated by FIG. B may be similarly configured. Utilizing all the above, the embodied solutions represented in FIGS. 2A and 2B may be implemented so as to reduce audio latency to as little as approximately 10 ms, for example.

Figure 3:
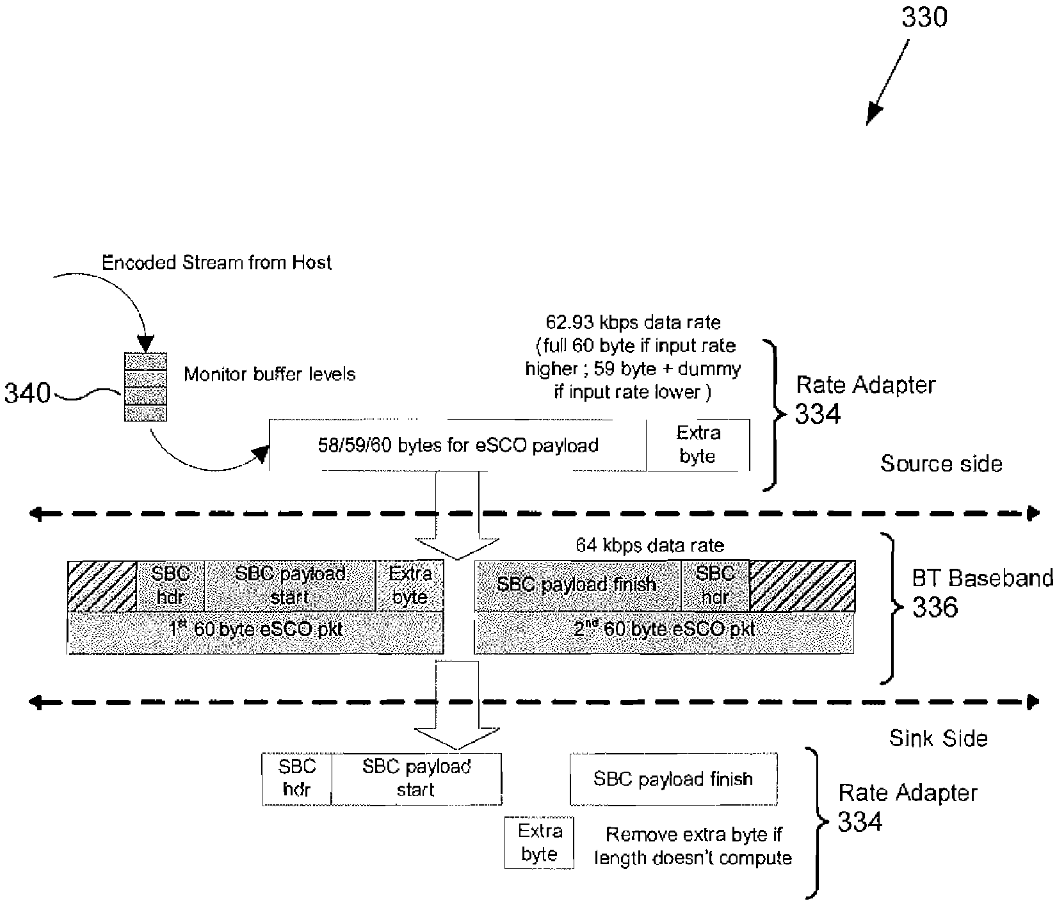
FIG. 3 presents a diagram of a system and method for providing reduced audio latency, according to one embodiment of the present invention.

FIG. 3 shows Bluetooth controller environment 330 configured to reduce audio latency, according to one embodiment of the present inventive concepts. According to the embodiment shown in FIG. 3, rate matching may be performed by the Bluetooth controller, while an audio codec may be implemented on a host unit (not shown in FIG. 3). Rate adapter 334, baseband 336, and buffers 340 of FIG. 3 correspond respectively to rate adapter 134, baseband 136, and PCM buffers 140 of FIG. 1; e.g., each corresponding structure may be configured to exhibit the same features and/or operate substantially the same as its counterpart.

The solution embodied in FIG. 3 includes Bluetooth controller 330 performing byte stuffing on encoded audio data received over an HCI and temporarily stored in, for example, buffers 340. For example, a source side of rate adapter 334 can be configured to add or remove a byte when forming a payload for a transmission packet prepared by baseband 336 for transmission over a wireless link, such as an established eSCO link, for example, in order to match an average incoming/outgoing bit rate from a host unit (not shown in FIG. 3), thus compensating for a monitored rate mismatch. As shown in FIG. 3, a sink side of rate adapter 334 can be configured to manage the variable rate by, for example, removing extra bytes while re-synchronizing with, for example, headers for frames of encoded audio data (e.g., an SBC frame header, for example).

For example, by adding or removing a single byte per transmission packet, an effective data rate for, for example, an eSCO link comprising 2EV3 packets having a 7.5 ms transmission rate, for example, can be varied between 64 kbps, 62.93 kbps and 61.87 kbps. As such, Bluetooth controller 330 may be configured to use rate adapter 334 to switch between the different data rates so as to match an instantaneous input rate, thereby substantially instantaneously compensating for a rate mismatch between a clock of a host unit (not shown in FIG. 3) and a clock of Bluetooth controller 330.

On the sink side of rate adapter 334, if the number of bytes between headers of frames of encoded data in two consecutive transmission packets of a transmission link is greater than an expected number of bytes, the extra bytes can simply be removed from the end of the first of the transmission packets. For example, where the frames of encoded audio data comprise SBC frames having a 7.5 ins frame rate, in order to substantially synchronize with a 2EV3 packet 7.5 ms frame rate for an eSCO link, for example, if the number of bytes between SBC frame headers is greater than 53 bytes, the extra bytes can be truncated from the end of the first transmission packet, as is substantially shown in FIG. 3, and the full SBC frame reconstituted from the consecutive transmission packets. As a result, the solution embodied in FIG. 3 can achieve reductions in audio latency without burdening the host unit, and can be implemented with substantially no loss of audio frames, even though frame alignment is not guaranteed.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. An electronic system for reducing audio latency in wireless communications, the electronic system comprising:
- a host unit for converting, encoding and decoding audio data, the host unit including a rate adapter and an audio codec;
- a wireless transceiver; and
- a digital interface facilitating communications between the host unit and the wireless transceiver;
- wherein the wireless transceiver includes a controller configured to monitor a rate mismatch between the host unit and the wireless transceiver and configured to communicate the rate mismatch to the host unit via the digital interface;
- wherein the host unit is configured to compensate for the rate mismatch using the rate adapter.

2. The electronic system of claim 1, wherein the host unit is configured to align a frame of encoded audio data and a transmission packet of the wireless transceiver.

3. The electronic system of claim 1, wherein the controller is configured to communicate a buffer utilization to the host unit.

4. The electronic system of claim 1, wherein the controller is configured to communicate a long term average of a buffer utilization to the host unit.

5. The electronic system of claim 1, wherein the controller is configured to communicate a time of arrival of a header for a frame of encoded data to the host unit.

6. The electronic system of claim 1, wherein the controller is configured to communicate frame misalignment data to the host unit.

7. The electronic system of claim 1, wherein the rate adapter performs sample rate conversion on the audio data to compensate for the rate mismatch.

8. The electronic system of claim 1, wherein the rate adapter performs sample add/drop on the audio data to compensate for the rate mismatch.

9. The electronic system of claim 1, wherein the rate adapter adjusts a master clock of the digital interface to compensate for the rate mismatch.

10. The electronic system of claim 1, wherein the rate adapter performs sample rate conversion on the audio data and adjusts a master clock of the digital interface in order to compensate for the rate mismatch and to align a frame of encoded audio data and a transmission packet of the wireless transceiver.

11. A method for use by an electronic system for reducing audio latency in wireless communications, the electronic system including a host unit and a wireless transceiver communicating via a digital interface, the method comprising:
- monitoring, using a controller of the wireless transceiver, a rate mismatch between the host unit and the wireless transceiver;
- communicating, using the digital interface, the rate mismatch from the wireless transceiver to the host unit; and
- compensating, using a rate adapter of the host unit, for the rate mismatch.

12. The method of claim 11 further comprising:
- aligning, using the host unit, a frame of encoded audio data and a transmission packet of the wireless transceiver.

13. The method of claim 11 further comprising:
- communicating, using the controller of the wireless transceiver, a buffer utilization to the host unit.

14. The method of claim 11 further comprising:
- communicating, using the controller of the wireless transceiver, a long term average of a buffer utilization to the host unit.

15. The method of claim 11 further comprising:
- communicating, using the controller of the wireless transceiver, a time of arrival of a header for a frame of encoded data to the host unit.

16. The method of claim 11 further comprising:
- communicating, using the controller of the wireless transceiver, frame misalignment data to the host unit.

17. The method of claim 11 further comprising:
- performing, using the rate adapter of the host unit, a sample rate conversion on the audio data to compensate for the rate mismatch.

18. The method of claim 11 further comprising:
- performing, using the rate adapter of the host unit, a sample add/drop on the audio data to compensate for the rate mismatch.

19. The method of claim 11 further comprising:

adjusting, using the rate adapter of the host unit, a master clock of the digital interface to compensate for the rate mismatch.

20. An electronic system comprising:

a host unit including a rate adapter;

a wireless transceiver including a controller configured to monitor a rate mismatch between the host unit and the wireless transceiver; and a digital interface facilitating a communication of the rate mismatch by the wireless transceiver to the host unit;

wherein the rate adapter is configured to compensate for the rate mismatch.

* * * * *